United States Patent
Lin

(10) Patent No.: US 9,442,645 B2
(45) Date of Patent: Sep. 13, 2016

(54) METHOD AND APPARATUS FOR LOCATING PLAYING PROGRESS OF FILE

(71) Applicant: TENCENT TECHNOLOGY (SHENZHEN) COMPANY LIMITED, Shenzhen (CN)

(72) Inventor: Sen Lin, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 372 days.

(21) Appl. No.: 14/222,946

(22) Filed: Mar. 24, 2014

(65) Prior Publication Data

US 2014/0208254 A1    Jul. 24, 2014

Related U.S. Application Data

(63) Continuation of application No. PCT/CN2012/077612, filed on Jun. 27, 2012.

(30) Foreign Application Priority Data

Sep. 27, 2011 (CN) .......................... 2011 1 0301835

(51) Int. Cl.
| | |
|---|---|
| *G06F 3/01* | (2006.01) |
| *G06F 3/0484* | (2013.01) |
| *G11B 27/34* | (2006.01) |
| *G06F 3/00* | (2006.01) |

(52) U.S. Cl.
CPC ........... *G06F 3/04847* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 7,380,216 B2 | 5/2008 | Feig et al. | |
| 8,060,826 B2 * | 11/2011 | Park | H04N 1/00291 715/720 |
| 8,443,388 B2 * | 5/2013 | Hong | H04N 5/44543 348/563 |
| 8,769,410 B2 * | 7/2014 | Park | G06F 3/04847 715/720 |
| 2006/0064716 A1 * | 3/2006 | Sull | G06F 17/30793 725/37 |
| 2008/0120647 A1 | 5/2008 | Shin | |

(Continued)

FOREIGN PATENT DOCUMENTS

| | | |
|---|---|---|
| CN | 1929595 A | 3/2007 |
| CN | 101232586 A | 7/2008 |

(Continued)

OTHER PUBLICATIONS

International Preliminary Report for International Application No. PCT/CN2012/077612 dated Apr. 10, 2014.

(Continued)

*Primary Examiner* — Toan Vu
(74) *Attorney, Agent, or Firm* — Harness, Dickey & Pierce, P.L.C.

(57) ABSTRACT

A location of a slider on a bottom progress bar is monitored and a first locating result is obtained according to the location of the slider on the bottom progress bar. A total length of the file and a progress adjustment range of an upper layer progress bar is determined according to the first locating result. The first locating result is within the progress adjustment range of the upper layer progress bar, a location of a slider of the upper progress bar is monitored, and playing progress of the file is determined according to the location of the slider on the upper layer progress bar and the first locating result.

9 Claims, 3 Drawing Sheets

(56) References Cited

U.S. PATENT DOCUMENTS

| | | | |
|---|---|---|---|
| 2009/0113334 A1* | 4/2009 | Chakra | G06F 9/4443 715/772 |
| 2011/0145745 A1* | 6/2011 | Hyeon | G06F 3/04855 715/769 |
| 2012/0047437 A1* | 2/2012 | Chan | G06F 3/0482 715/720 |

FOREIGN PATENT DOCUMENTS

| | | |
|---|---|---|
| CN | 101518069 A | 8/2009 |
| CN | 101727949 A | 6/2010 |
| CN | 101901622 A | 12/2010 |

OTHER PUBLICATIONS

Chinese Office Action for Application No. 2011103018357 dated Apr. 25, 2015, and an English concise explanation of relevance thereof.

International Search Report for Application No. PCT/CN2012/077612, dated Sep. 13, 2012, and its English translation thereof.

Chinese Office Action for Chinese Application No. 2011103018357 dated Dec. 21, 2015, and an English concise explanation of relevance thereof.

* cited by examiner

METHOD AND APPARATUS FOR LOCATING PLAYING PROGRESS OF FILE

CROSS-REFERENCE TO RELATED APPLICATIONS

This application is a Continuation of International Application No. PCT/CN2012/077612, filed Jun. 27, 2012. This application claims the benefit and priority of CN#201110301835.7, filed Sep. 27, 2011. The entire disclosures of each of the above applications are incorporated herein by reference.

FIELD

The present disclosure relates to computer technologies, and more particularly, to method and apparatus for locating playing progress of a file.

BACKGROUND

This section provides background information related to the present disclosure which is not necessarily prior art.

Users often view files using a Personal Computer or a handheld smart device. When viewing a file, e.g. a film file, the user always needs to determine a certain playing point of the film file, and then the film file is played from the determined playing point.

Currently, a conventional player on a PC or the handheld smart device includes a progress bar, a slider, and a text area. Playing progress is determined according to the location of the slider on the progress bar and the playing progress is displayed on the text area.

SUMMARY

This section provides a general summary of the disclosure, and is not a comprehensive disclosure of its full scope or all of its features.

Examples of the present disclosure provide a method and apparatus for locating playing progress of a file, so as to precisely locate the playing progress of the file.

Technical solutions of the present disclosure are implemented as follows.

A method for locating playing progress of a file includes:
monitoring a location of a slider on a bottom progress bar;
obtaining a first locating result according to the location of the slider on the bottom progress bar and a total length of the file;
determining a progress adjustment range of an upper layer progress bar according to the first locating result; the first locating result being within the progress adjustment range of the upper layer progress bar;
monitoring a location of a slider of the upper progress bar; and
determining playing progress of the file according to the location of the slider on the upper layer progress bar and the first locating result.

An apparatus for locating playing progress of a file includes: a memory and a processor for executing instructions stored in the memory. The instructions comprise of:
a bottom adjusting instruction to monitor a location of a slider on a bottom progress bar, locate playing progress of a file according to the location of the slider on the bottom progress bar and a total length of the file, and obtain a first locating result;
an upper layer adjusting instruction to determine a progress adjustment range of an upper layer progress bar according to the first locating result; and monitor a location of a slider of the upper progress bar; the first locating result being within the progress adjustment range of the upper layer progress bar; and
a locating instruction to determine target playing progress of the file according to the location of the slider on the upper layer progress bar and the progress adjustment range of the upper layer progress bar.

As can be seen from the above solutions, at least two progress bars are configured. The first location result is obtained according to the location of the slider on the bottom progress bar; the progress adjustment range of the upper layer progress bar is determined according to the first locating result; the playing progress of the file is determined according to the location of the slider on the upper layer progress bar and the first locating result progress is shown in the adjustment range of the upper layer progress bar. The bottom progress bar may be used for rough locating, i.e. a minute level, and the upper layer progress bar may be used for precise locating, i.e. a second level. Therefore, by using the solutions of the present disclosure, the playing progress of the file is precisely located.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
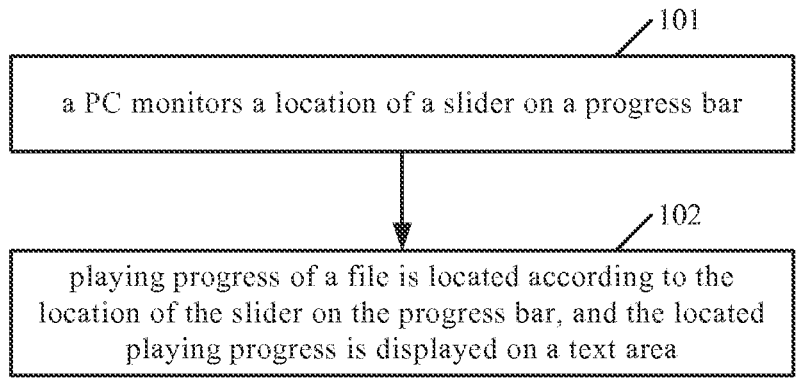
FIG. 1 is a flowchart illustrating a conventional method for locating playing progress of a file via a player on a PC.

FIG. 1 is a flowchart illustrating a conventional method for locating playing progress of a file via a player on a PC.

As shown in FIG. 1, the method includes the following processing.

At 101, a PC monitors a location of a slider on a progress bar.

At 102, playing progress of a file is located according to the location of the slider on the progress bar, and the located playing progress is displayed on a text area.

In FIG. 1, in the initial playing point of the file, the slider is located at the left end of the progress bar. As long as the slider moves along the progress bar, the PC determines a proportion of a distance between the location of the slider and the left end of the progress bar to a total length of the progress bar, and determines the playing progress of the file as a product of the proportion and a total length of the file. For example, if the proportion of the distance between the location of the slider and the left end of the progress bar to the total length of the progress bar is ½0, and the total length of the file is 120 minutes, the PC determines the playing progress of the file as the sixth minute of the file.

When locating playing progress of a file via the handheld smart device, the same processing as shown in FIG. 1 is performed.

Normally, the size of the PC screen is large, e.g. 14 or 15 inches, and thus, the total length of the progress bar displayed on the PC screen is relatively long. Therefore, it is easier for a user to locate the playing progress of the file by adjusting the location of the slider on the progress bar. However, the handheld device has a small screen, and the total length of the progress bar is relatively short. As a result, it is more challenging to locate the playing progress of the file only by adjusting the location of the slider on the progress bar. For example, when the total length of a file is 120 minutes, if the sixth minute of the file needs to be located, a location is determined, the proportion of the distance between the location and the left end of the progress bar to the total length of the progress bar is ½0, and then the slider is moved to the determined location. Since the total length of the progress bar is relatively short, it is hard to determine the location precisely on the handheld smart device.

Further, it is challenging to implement extended file progress precision on the PC, e.g. the precision of a second level. For example, when the total length of a file is 120 minutes, it is challenging to locate a location corresponding to 15 minutes and 30 seconds of the file on the PC.

According to examples of the present disclosure, at least two progress bars are configured, a first locating result is obtained according to a location of a slider on a bottom progress bar, a progress adjustment range of an upper layer progress bar is determined according to the first locating result, and a target playing progress is determined according to a location of a slider on an upper layer progress bar and the first locating result.

According to various examples of the present disclosure, the bottom progress bar and the upper layer progress bar are relative. For example, when there are three progress bars, for the first progress bar and the second progress bar, the first progress bar is the bottom progress bar and the second progress bar is the upper layer progress bar; for the second progress bar and the third progress bar, the second progress bar is the bottom progress bar and the third progress bar is the upper layer progress bar. According to various examples of the present disclosure, the number of the progress bars is at least two.

The examples of the present application provide the following technical solutions.

Figure 2:
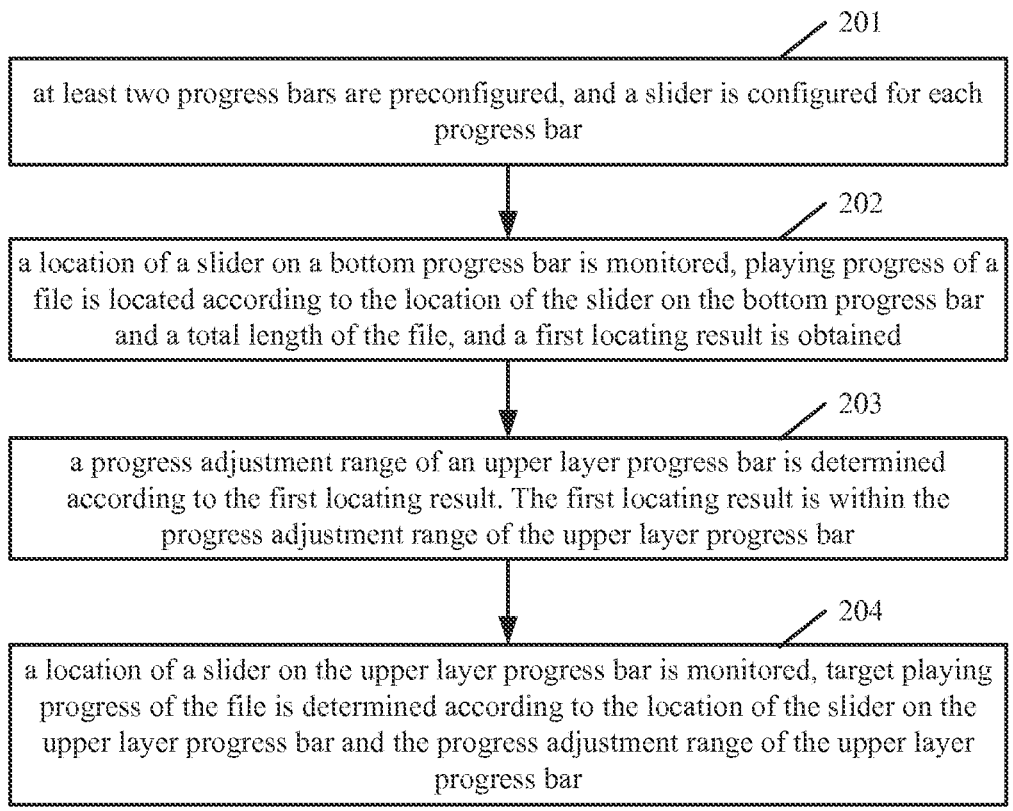
FIG. 2 is a flowchart illustrating a method for locating playing progress of a file according to various examples of the present disclosure.

FIG. 2 is a flowchart illustrating a method for locating playing progress of a file according to various examples of the present disclosure. As shown in FIG. 2, the method includes the following processing:

At 201, at least two progress bars are preconfigured, and a slider is configured for each progress bar.

The processing at 201 is performed in advance. In this way, when a file playing apparatus is designed, at least two progress bars are configured for the file playing apparatus and each progress bar is configured with a slider.

When the file playing apparatus is used for locating playing progress of a file, processing at 202 may be performed directly.

At 202, a location of a slider on a bottom progress bar is monitored, playing progress of a file is located according to the location of the slider on the bottom progress bar and a total length of the file, and a first locating result is obtained.

According to an example at 202, a first proportion is obtained by dividing a distance between the location of the slider and a starting point of the bottom progress bar by a total length of the bottom progress bar, and the playing progress of the file is located as a file location corresponding to a product of the total length of the file and the first proportion.

At 203, a progress adjustment range of an upper layer progress bar is determined according to the first locating result. The first locating result is within the progress adjustment range of the upper layer progress bar.

According to various embodiments, the first locating result needs to be within the progress adjustment range of the upper layer progress bar. According to various embodiments, the first locating result is configured as a starting point or an end point of the progress adjustment range of the upper layer progress bar. For example, if a progress range between the first locating result and the end of the file is larger than or equal to a maximum adjustment range of the upper layer progress bar, the first locating result is configured as a starting point of the progress adjustment range of the upper layer progress bar, and an end point of the progress adjustment range is determined according to the maximum adjustment range of the upper layer progress bar.

If the progress range between the first locating result and the end of the file is smaller than the maximum adjustment range of the upper layer progress bar, the first locating result is configured as the end point of the progress adjustment range of the upper layer progress bar, and the starting point of the progress adjustment range is determined according to the maximum adjustment range of the upper layer progress bar.

At 204, a location of a slider on the upper layer progress bar is monitored, and target playing progress of the file is determined according to the location of the slider on the upper layer progress bar and the first locating result. According to various embodiments, when the starting point of the progress adjustment range of the upper layer progress bar is the first locating result, the target playing progress of the file is determined according to the following processing. A second proportion is obtained by dividing a distance between the location of the slider on the upper layer progress bar and a starting point of the upper layer progress bar by the total length of the upper layer progress bar. A second locating result is obtained by multiplying the maximum adjustment range of the upper layer progress bar by the second proportion, and the target playing progress of the file is determined as a sum of the first locating result and the second locating result.

When the end point of the progress adjustment range of the upper layer progress bar is the first locating result, the target playing progress of the file is determined according to the following processing. A third proportion is obtained by dividing a distance between the location of the slider on the upper layer progress bar and the end point of the upper layer progress bar by the total length of the upper layer progress bar. A third locating result is obtained by multiplying the maximum adjustment range of the upper layer progress bar by the third proportion, and the target playing progress of the file is determined as a difference obtained by subtracting the third locating result from the first locating result.

According to various embodiments, the first locating result may be configured as any designated location on the upper layer progress bar. For example, the first locating result may be configured as a location in the middle of the upper layer progress bar. A fourth proportion is obtained by dividing a distance between the location of the slider on the upper layer progress bar and the first locating result by the total length of the upper layer progress bar. A fourth locating result is obtained by multiplying the maximum adjustment range of the upper layer progress bar by the fourth proportion, and the target playing progress of the file is determined according to the first locating result and the fourth locating result.

For example, if the first locating result corresponds to a location in the middle of the upper layer progress bar, the slider of the upper layer progress bar is located at the left end of the upper layer progress bar. The fourth locating result is a result corresponding to half of the maximum adjustment range of the upper layer progress bar, and the target playing progress of the file is obtained by subtracting half of the maximum adjustment range of the upper layer progress bar from the first locating result.

According to various embodiments, for the purpose of reducing displaying space occupied by the progress bars, the upper layer progress bar and the slider of the upper layer progress bar are displayed during a preconfigured time period starting when a command of changing a location of the slider on the bottom progress bar is received The upper layer progress bar and the slider on the upper layer progress bar are otherwise hidden in other time periods except during the preconfigured time period. As a result, displaying space occupied by the progress bars is reduced.

An example is provided to illustrate the method shown in FIG. 2, and the example is not used to limit the present disclosure. In various embodiments, there are two progress bars. The bottom progress bar is called a main progress bar, and the upper layer progress bar is called a vernier. The vernier is displayed only when the user adjusts the progress by using the main progress bar, so as to reduce displaying space occupied by the progress bars without affecting the usage of the main progress bar.

Figure 3:
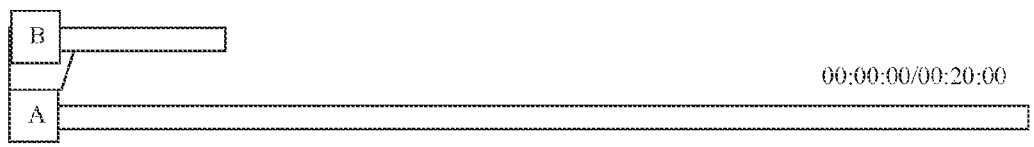
FIG. 3 illustrates progress adjustment according to various examples of the present disclosure.

FIG. 3 illustrates progress adjustment according to various examples of the present disclosure.

In various embodiments, the maximum adjustment range of the main progress bar is 20 minutes and the maximum adjustment arrange of the vernier is 1 minute. As shown in FIG. 3, after the progress bars are initialized, a main slider A is located at the left end of the main progress bar, and a vernier slider B is located at the left end of the vernier progress bar. The total progress time is equal to main slider time (00:00:00)+vernier slider time (0 second)=00:00:00.

In FIG. 3, the main progress bar corresponds to a conventional progress bar. The conventional progress bar and slider are reserved and used for rough locating. When the desired precision cannot be achieved or when it is hard to precisely locate a location corresponding to a needed time point, the main slider may be moved to a location corresponding to a time point slightly earlier than the desired time point, and it is ensured that the desired time point is later than the time point corresponding to the main slider and within the progress adjustment arrange of the vernier.

Figure 4:
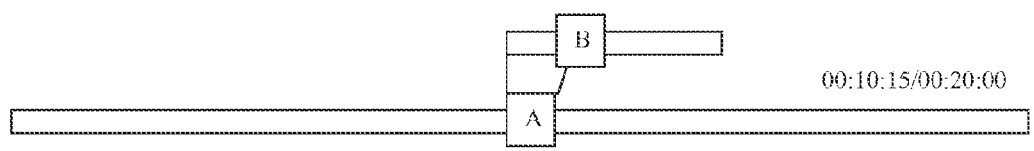
FIG. 4 illustrates progress adjustment according to various examples of the present disclosure.

FIG. 4 illustrates progress adjustment according to various examples of the present disclosure. In FIG. 4, the total time of the main progress bar is 20 minutes and a location corresponding to 10 minutes and 15 seconds on the progress bar needs to be located. The maximum adjustment range of the vernier is one minute. Therefore, the main slider A may be placed at a location corresponding to 10 minutes on the main progress bar, and then the vernier slider B may be placed at a location corresponding to 15 seconds, which is easily implemented. In FIG. 4, the total progress time is equal to the main slider time (00:10:00)+vernier slider time (15 seconds)=00:10:15.

Figure 5:
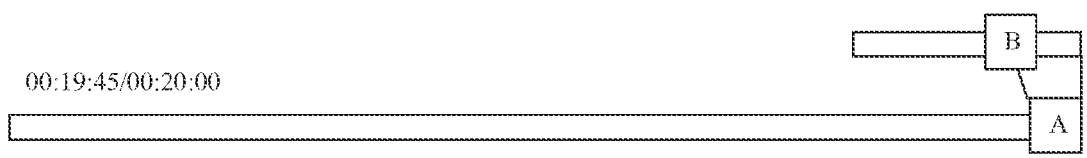
FIG. 5 illustrates progress adjustment according to various examples of the present disclosure.

FIG. 5 illustrates progress adjustment according to various examples of the present disclosure. In FIG. 5, when the main slider is moved to the right end of the main progress bar, if the starting point of the vernier is still positioned at the location of the main slider, the adjustment of the vernier is invalid. Hence, the direction of the vernier is adjusted automatically.

According to various embodiments, the direction of the vernier is adjusted automatically when the location of the main slider on the main progress bar correspond to a time point later than the maximum adjustment range of the main progress bar–the maximum adjustment range of the vernier, e.g. (20 minutes–1 minute=19 minutes). At the same time, the vernier slider is moved to the right end of the vernier, the time corresponding to the vernier slider is calculated according to the distance between the vernier slider and the right end of the vernier, and the target playing progress is obtained by subtracting the time corresponding to the vernier slider from the time corresponding to the main slider.

In FIG. 5, the main slider is located at the right end of the main progress bar and the vernier slider is moved to a location corresponding to a time point 15 seconds before the right end of the vernier. Thus, the total progress time is equal to the main slider time (00:20:00)–vernier slider time (15 seconds)=00:19:45.

According to the above various embodiments, the location corresponding to any time point may be located precisely on the progress bar. When the precision is not enough, the length of the vernier may be increased, or the maximum adjustment range of the vernier may be reduced, so as to improve the precision. Further, another vernier may be added, e.g. the vernier of the second layer may be added in addition to the vernier of the first layer, and the vernier of the second layer may be automatically displayed when the user adjusts the slider on the vernier of the first layer, thereby reducing the displaying space occupied by the progress bar.

According to various embodiments, an apparatus for locating playing progress of a file is provided.

Figure 6:
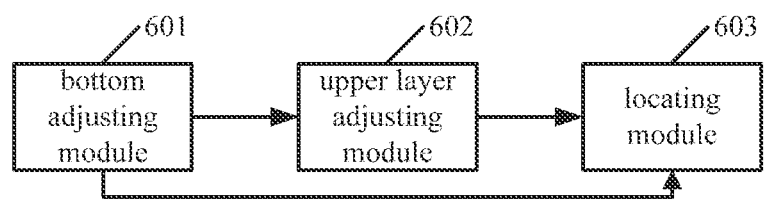
FIG. 6 illustrates an apparatus for locating playing progress of a file according to various examples of the present disclosure.

FIG. 6 illustrates an apparatus for locating playing progress of a file according to various examples of the present disclosure. As shown in FIG. 6, the apparatus includes a bottom adjusting module 601, an upper layer adjusting module 602, and a locating module 603.

The bottom adjusting module 601 is to monitor a location of a slider on a bottom progress bar, locate playing progress of a file according to the location of the slider on the bottom progress bar and the total length of the file, and obtain a first locating result.

The upper layer adjusting module 602 is to determine a progress adjustment range of an upper layer progress bar according to the first locating result; and monitor a location of a slider of the upper progress bar. The first locating result is within the progress adjustment range of the upper layer progress bar.

The locating module 603 is to determine target playing progress of the file according to the location of the slider on the upper layer progress bar and the progress adjustment range of the upper layer progress bar.

According to various embodiments, the bottom adjusting module 601 is to obtain a first proportion via dividing a distance between the location of the slider of the bottom progress bar and a starting point of the bottom progress bar by a total length of the bottom progress bar, and therefore locate the playing progress of the file as a file location corresponding to a product of the total length of the file and the first proportion.

According to various embodiments, if a progress range between the first locating result and the end of the file is larger than or equal to a maximum adjustment range of the upper layer progress bar, the upper layer adjusting module 602 is to configure the first locating result as a starting point of the progress adjustment range of the upper layer progress bar, and determine an end point of the progress adjustment range of the upper layer progress bar according to the maximum adjustment range of the upper layer progress bar.

The locating module 603 is to obtain a second proportion via dividing a distance between the location of the slider of the upper layer progress bar and a starting point of the upper layer progress bar by a total length of the upper layer progress bar, obtain a second locating result via multiplying the maximum adjustment range of the upper layer progress bar by the second proportion, and determine the target playing progress of the file as a sum of the first locating result and the second locating result.

According to various embodiments, if the progress range between the first locating result and the end of the file is smaller than the maximum adjustment range of the upper layer progress bar, the upper layer adjusting module 602 is to configure the first locating result as the end point of the progress adjustment range of the upper layer progress bar, and determine the starting point of the progress adjustment range of the upper layer progress bar according to the maximum adjustment range of the upper layer progress bar.

The locating module 603 is to obtain a third proportion via dividing a distance between the location of the slider of the upper layer progress bar and the end point of the upper layer progress bar by the total length of the upper layer progress bar, obtain a third locating result via multiplying the maximum adjustment range of the upper layer progress bar by the third proportion, and determine the target playing progress of the file as a difference obtained by subtracting the third locating result from the first locating result.

The bottom adjusting module 601 is to send a display instruction after receiving a command to change location of the slider of the bottom progress bar.

The upper layer adjusting module 602 is to display the upper layer progress bar and the slider of the upper layer progress bar during a preconfigured time period starting when the command of changing the location of the slider of the bottom progress bar is received, and hide the upper layer progress bar and the slider of the upper layer progress bar at any point other than the preconfigured time period.

Each various embodiment of the present disclosure may be implemented by a data processing program executed by a data processing device, e.g. a computer. The data processing program is included in the examples of the present disclosure. Generally, the data processing program stored in storage medium may directly read a program from the storage medium, or may install or copy the program to a storage device of the data processing device (e.g. a hard disk or memory). Thus, the storage medium is included in the examples of the present disclosure. The storage medium may use any recording mode, for example, a page storage medium (e.g. tape), a magnetic storage media (e.g. floppy disks, hard disks, flash drives), an optical storage medium (e.g. CD-ROM), or a magnetic-optical storage medium (e.g. MO).

According to various embodiments, a storage medium is also provided, which is to store a data processing program to allow a machine to execute a method as described herein.

The methods and modules described herein may be implemented by hardware, machine-readable instructions, or a combination of hardware and machine-readable instructions. Machine-readable instructions used in the examples disclosed herein may be stored in a non-transitory storage medium readable by multiple processors, such as a hard drive, CD-ROM, DVD, compact disk, floppy disk, magnetic tape drive, RAM, ROM, or other proper storage device. Or, at least part of the machine-readable instructions may be substituted by specific-purpose hardware, such as custom integrated circuits, gate array, FPGA, PLD, specific-purpose computers, and so on.

A non-transitory machine-readable storage medium is also provided, which is to store instructions to cause a machine to execute a method as described herein. Specifically, a system or apparatus having a non-transitory storage medium that stores machine-readable program codes for implementing functions of any of the above examples, which may make the system or the apparatus (or CPU or MPU) read and execute the program codes stored in the storage medium.

In this situation, the program codes read from the non-transitory storage medium may implement any one of the above examples. Thus, the program codes and the non-transitory storage medium storing the program codes are part of the technical scheme.

The storage medium for providing the program codes may include a floppy disk, hard drive, magneto-optical disk, compact disk (such as CD-ROM, CD-R, CD-RW, DVD-ROM, DVD-RAM, DVD-RW, DVD+RW), a magnetic tape drive, flash card, ROM, and so on. The program code may also be optionally downloaded from a server computer via a communication network.

In one alternative to the program codes being executed by a computer, at least part of the operations performed by the program codes may be implemented by an operation system running in a computer following instructions based on the program codes to realize the technical scheme of any of the above examples.

In addition, the program codes implemented from a storage medium are written in storage in an extension board inserted in the computer or in storage in an extension unit connected to the computer. In this example, a CPU in the extension board or the extension unit executes at least part of the operations according to the instructions based on the program codes to realize the technical scheme of any of the above examples.

The foregoing various embodiments of the present disclosure and are not meant to limit the protection scope of the present disclosure. Any modification, equivalent substitution, and improvement are within the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. A method for locating playing progress of a file, comprising:
    monitoring a location of a slider on a bottom progress bar;
    obtaining a first locating result according to the location of the slider on the bottom progress bar and a total length of the file;
    determining a progress adjustment range of an upper layer progress bar according to the first locating result; the first locating result being within the progress adjustment range of the upper layer progress bar;
    monitoring a location of a slider of the upper progress bar; and
    determining playing progress of the file according to the location of the slider on the upper layer progress bar and the first locating result;
    wherein determining the progress adjustment range of the upper layer progress bar according to the first locating result comprises:
    when a progress range between the first locating result and an end of the file is larger than or equal to a maximum adjustment range of the upper layer progress bar,
    configuring the first locating result as a starting point of the progress adjustment range of the upper layer progress bar, and
    determining an end point of the progress adjustment range of the upper layer progress bar according to the maximum adjustment range of the upper layer progress bar;
    wherein determining the playing progress of the file comprises:
    obtaining a second proportion via dividing a distance between the location of the slider of the upper layer progress bar and a starting point of the upper layer progress bar by a length of the upper layer progress bar, and
    obtaining a second locating result via multiplying the maximum adjustment range of the upper layer progress bar by the second proportion; and
    determining the playing progress of the file as a sum of the first locating result and the second locating result.

2. The method of claim 1, wherein determining the playing progress of the file according to the location of the slider on the upper layer progress bar and the progress adjustment range of the upper layer progress bar comprises:
    obtaining a first proportion via dividing a distance between the location of the slider of the bottom progress bar and a starting point of the bottom progress bar by a length of the bottom progress bar, and
    locating the playing progress of the file as a file location corresponding to a product of the total length of the file and the first proportion.

3. The method of claim 1, wherein determining the progress adjustment range of the upper layer progress bar according to the first locating result comprises:
    if a progress range between the first locating result and an end of the file is smaller than a maximum adjustment range of the upper layer progress bar,
    configuring the first locating result as an end point of the progress adjustment range of the upper layer progress bar, and
    determining a starting point of the progress adjustment range of the upper layer progress bar according to the maximum adjustment range of the upper layer progress bar;
    wherein determining the playing progress of the file comprises:
    obtaining a third proportion via dividing a distance between the location of the slider of the upper layer progress bar and the end point of the upper layer progress bar by a length of the upper layer progress bar;
    obtaining a third locating result via multiplying the maximum adjustment range of the upper layer progress bar by the third proportion; and
    determining the target playing progress of the file as a difference between the third locating result and the first locating result.

4. The method of claim 1, further comprising:
    displaying the upper layer progress bar and the slider of the upper layer progress bar during a preconfigured time period starting when a command of changing a location of the slider of the bottom progress bar is received; and
    hiding the upper layer progress bar and the slider of the upper layer progress bar in other time period except the preconfigured time period.

5. A non-transitory machine-readable storage medium, storing computer programs for executing a method according to claim 1.

6. An apparatus for locating playing progress of a file, comprising: a memory and a processor for executing instructions stored in the memory, the instructions comprise:
    a bottom adjusting instruction, to monitor a location of a slider on a bottom progress bar, locate playing progress of a file according to the location of the slider on the bottom progress bar and a total length of the file, and obtain a first locating result;
    an upper layer adjusting instruction, to determine a progress adjustment range of an upper layer progress bar according to the first locating result; and monitor a location of a slider of the upper progress bar; the first locating result being within the progress adjustment range of the upper layer progress bar; and
    a locating instruction, to determine target playing progress of the file according to the location of the slider on the upper layer progress bar and the progress adjustment range of the upper layer progress bar;
    when a progress range between the first locating result and an end of the file is larger than or equal to a maximum adjustment range of the upper layer progress bar,
    the upper layer adjusting instruction is to configure the first locating result as a starting point of the progress adjustment range of the upper layer progress bar, and determine an end point of the progress adjustment range of the upper layer progress bar according to the maximum adjustment range of the upper layer progress bar;

the locating instruction is to obtain a second proportion via dividing a distance between the location of the slider of the upper layer progress bar and a starting point of the upper layer progress bar by a total length of the upper layer progress bar; obtain a second locating result via multiplying the maximum adjustment range of the upper layer progress bar by the second proportion; and determine the target playing progress of the file as a sum of the first locating result and the second locating result.

7. The apparatus of claim 6, wherein
the bottom adjusting instruction is to obtain a first proportion via dividing a distance between the location of the slider of the bottom progress bar and a starting point of the bottom progress bar by a total length of the bottom progress bar, and locate the playing progress of the file as a file location corresponding to a product of the total length of the file and the first proportion.

8. The apparatus of claim 6, wherein
if a progress range between the first locating result and an end of the file is smaller than a maximum adjustment range of the upper layer progress bar,
the upper layer adjusting instruction is to configure the first locating result as an end point of the progress adjustment range of the upper layer progress bar, and determine a starting point of the progress adjustment range of the upper layer progress bar according to the maximum adjustment range of the upper layer progress bar;
the locating instruction is to obtain a third proportion via dividing a distance between the location of the slider of the upper layer progress bar and the end point of the upper layer progress bar by a total length of the upper layer progress bar; obtain a third locating result via multiplying the maximum adjustment range of the upper layer progress bar by the third proportion; and determine the target playing progress of the file as a difference obtained by subtracting the third locating result and the first locating result.

9. The apparatus of claim 6, wherein
the bottom adjusting instruction is to send a display instruction after receiving a command of changing a location of the slider of the bottom progress bar;
the upper layer adjusting instruction is to display the upper layer progress bar and the slider of the upper layer progress bar during a preconfigured time period starting when the command of changing the location of the slider of the bottom progress bar is received, and hide the upper layer progress bar and the slider of the upper layer progress bar in other time period except the preconfigured time period.

* * * * *